United States Patent
Yoshida

(10) Patent No.: US 7,421,823 B2
(45) Date of Patent: Sep. 9, 2008

(54) LOWER SASH MADE OF RESIN

(75) Inventor: Hiromitsu Yoshida, Soja (JP)

(73) Assignee: Asteer Co., Ltd., Okayam (JP)

( * ) Notice: Subject to any disclaimer, the term of this patent is extended or adjusted under 35 U.S.C. 154(b) by 523 days.

(21) Appl. No.: 10/993,683

(22) Filed: Nov. 19, 2004

(65) Prior Publication Data
US 2005/0120502 A1 Jun. 9, 2005

(30) Foreign Application Priority Data
Dec. 4, 2003 (JP) ............................. 2003-405833

(51) Int. Cl.
*E05D 13/00* (2006.01)
(52) U.S. Cl. .......................................... 49/416; 49/415
(58) Field of Classification Search .................. 49/348, 49/404, 415, 416, 417, 419, 423
See application file for complete search history.

(56) References Cited

U.S. PATENT DOCUMENTS 4,663,388 A * 5/1987 Douglass et al. .............. 49/441
6,305,125 B1 * 10/2001 Nozaki et al. ................. 49/416
7,062,880 B2 * 6/2006 Renke et al. .................. 49/414

FOREIGN PATENT DOCUMENTS

| JP | 10-067228 | 3/1998 |
|----|-----------|--------|
| JP | 10-291418 | 11/1998 |
| JP | 11-280331 | 10/1999 |
| JP | 2000-240347 | 9/2000 |
| JP | 2000-301946 | 10/2000 |

* cited by examiner

*Primary Examiner*—Jerry Redman
(74) *Attorney, Agent, or Firm*—William L. Androlia; H. Henry Koda

(57) ABSTRACT

A lower sash made of resin comprising a scraper for suppressing or preventing entry of the foreign substances itself as means for suppressing or preventing generation of noise is provided. The lower sash made of resin comprising a substantially channel-structured frame extending along a direction in which a window glass ascends and descends, the frame comprising wings provided upright on both sides of a base, and glass guides provided in opposition to the wings each other, and further comprising a scraper is provided at an upper end of the frame to come into sliding contact with an outer surface of the descending window glass.

10 Claims, 8 Drawing Sheets

LOWER SASH MADE OF RESIN

TECHNICAL FIELD

The present invention relates to a lower sash made of resin to be mounted in a door panel for guiding a window glass.

BACKGROUND OF THE INVENTION

As shown in JP-A-10-291418, for example, a large number of the conventional lower sashes comprise a combination of a frame made of a plate metal and a glass run-channel made of rubber. However, the conventional lower sashes not only have relatively heavy weight itself but also cost high for being assembled and materials thereof. Therefore, these lower sashes have been gradually replaced by lower sashes made of resin, which can be manufactured by molding integrally. On the other hand, the lower sashes made of resin involve problems in that a descending window glass generates rattle sound with colliding against a glass guide and foreign substances such as sand or the like entered between the window glass and the glass guide generates noise. Therefore, in the lower sash made of resin, it becomes subject how to suppress or prevent from generating rattle sound or noise.

For example, JP-A-10-067228 discloses a window glass running stability device comprising a plate spring having means for removing dust on its sliding surface with the glass. The plate spring corresponds to a glass guide of the present invention and the window glass running stability device corresponds to a lower sash of the present invention. The means for removing dust concretely comprises irregularities provided on the sliding surface of the plate spring. The irregularities are any one of slits, projections, ribs, and crimp. According to the disclosure of JP-A-10-067228, the means for removing dust removes foreign substances itself causes generation of noise or the like.

JP-A-11-280331 discloses a window glass running stability device comprising a pair of glass holding sections having projecting pieces and provided contiguous to a frame corresponding to the base of the preset invention. The projecting piece corresponds to the glass guide of the present invention and is to be located at positions to slide on glass. Also, the glass holding section corresponds to the frame of the present invention. According to the disclosure of JP-A-11-280331, vibration of the glass holding section causing to generate noise is forcefully suppressed by enhancing the rigidity of the glass holding section provided as a base for the projecting piece.

JP-A-2000-240347 discloses a construction of an elevating door glass guide in which the glass guide formed in a tongue-like manner is connected to an inner surface of a side wall of a sash corresponding to the frame of the present invention. The glass guide comprises a projection having a sharp-pointed nose edge in sliding contact with a door glass surface. According to the disclosure of JP-A-2000-240347, the projecting portion and the door glass surface come into substantially linear contact with each other whereby influences of the glass guide on a window glass are decreased to make it hard to generate noise.

JP-A-2000-301946 discloses a lower sash structure for automobile door glass, in which guide pieces comprising a slide-holding surface made of a soft material different from that of a sash body are projectingly provided. According to the disclosure of JP-A-2000-301946, the slide-holding surface acts to suppress or prevent rattle sound (described as noise in JP-A-2000-301946).

SUMMARY OF THE INVENTION

Rattle sound can be suppressed or prevented by improving a structure of a lower sash made of resin. However, it is difficult to suppress or prevent generation of noise caused by entering foreign substances by means of only improvement of the structure mentioned above. Accordingly, it is preferable to suppress or prevent entry of foreign substances itself as far as possible. In this connection, JP-A-10-067228 suggests a lower sash made of resin taking countermeasures against generation of noise. Further, while JP-A-2000-301946 does not mention about noise, it may be expected that the structure of JP-A-2000-301946 can function or effect equivalent to the structure disclosed in JP-A-10-067228.

A majority of foreign substances causing generation of noise is sand. Slits or the like provided on the glass guide as disclosed in JP-A-10-067228 can adequately remove sand as long as the width of the slits is wider than the particle size of sand. When the particle size of sand is somewhat larger than the width of the slits, however, it is possible not to remove sand since sand is bit into the slits. Also, when the foreign substances is not sand but something clayey like muddy water or so, it is also possible not to remove clayey since they will fill the slits. The clogging of the surface of the slits is supposed to appear in the structure of JP-A-2000-301946, more conspicuously.

Therefore, the present inventor has examined a structure or a construction of a lower sash made of resin in order to develop the means for avoiding occurrence of the clogging of foreign substances as disclosed in JP-A-10-067228 and JP-A-2000-301946, while adopting the means for suppressing or preventing generation of noise.

As a result of the examination, the present inventor has developed a lower sash made of resin comprising a substantially channel-structured frame extending along a direction in which a window glass ascends and descends, the frame comprising a base, a pair of wings provided being opposed to each other upright on both sides of the base, and a plurality of glass guides provided on respective opposed surfaces of the both wings, and further comprising a scraper provided at an upper end of the frame or in the vicinity of the upper end to come into sliding contact with an outer surface or inner surface of the descending window glass. The lower sash made of resin according to the present invention comprises, as means for preventing entry of foreign substances, a scraper provided at an upper end of the frame or in the vicinity of the upper end to come into sliding contact with a surface of a window glass. The scraper successively cleans a surface of the descending window glass. The scraper may be formed to have its size corresponding to a width of the wings, which is sufficient to prevent entry of foreign substances into the lower sash.

The scraper of the present invention is provided on one or both of the wings to come into sliding contact with the window glass in the same manner as the glass guides. The scraper may be provided anywhere on the frame as long as the scraper sliding-contacts with the surface of the window glass. Further, it is simplest configuration in which the scraper is provided on the opposed surfaces of the wings in the same positional relationship as that of the glass guides, which are opposed to each other with the window glass therebetween. Usually, the foreign substances adheres to an outer surface of a window glass facing outside a vehicle. Therefore, the scraper is fundamentally configured on the opposed surface of the outer wing facing to the outer surface of the window glass. To configure the scraper on the opposed surface of the inner wing facing o the inner surface of the window glass may be supplementary. Thus, the scraper provided on the wing comes into sliding contact with the window glass in the same manner as the glass guides whereby the scraper functions without obstructing the travel of the window glass.

Also, the scraper preferably has a configuration that it is removable from a scraper housing portion provided on at least one of the opposed wings to come into sliding contact with the window glass in the same manner as the glass guides. The scraper is easy to be influenced by the outside circumstance since the scraper is provided at an upper end of the frame of the lower sash or in the vicinity of the upper end. Further, the scraper always comes into sliding contact with the surface of the window glass while the window glass is in travel. Therefore, it can be imagined that deterioration of the scraper causes necessity of its replacement. Accordingly, the scraper is preferably configured to be removable. The scraper housing portion has the locating function for mounting the scraper and the stabilizing function for fixing and holding a position of the mounted scraper. The stabilizing function of the scraper housing portion can be achieved by setting the size of the mounting space of the scraper housing portion tight. In order to display a more reliable stabilizing function, an engagement portion for engaging with a part of the inserted scraper is preferably provided on an opening portion of the scraper housing portion to prevent the scraper from coming off. The engaging portion, for example, may be formed as an elastic engagement plate to cover a part of the opening portion so that the scraper can be easily removed while preventing to drop the scraper out.

The scraper peels off foreign substances adhered to the surface of the window glass. The foreign substances as peeled off fall in the vicinity of the lower sash. If the foreign substances being peeled off adhered again to the window glass, the action of removal of foreign substances by the scraper would go for nothing. Then, the scraper is preferably configured to comprise a slide edge inclined in downward pitch toward the base. Thereby, foreign substances peeled off from the surface of the window glass fall along the slide edge in a direction away from the window glass, so that it is possible to control a drop position of the foreign substances to a certain degree. As a result, it can be avoided that the foreign substances peeled off adheres to the window glass again.

The scraper housing portion usually comprises a space having a substantially rectangular parallelopiped shape copied the configuration of the scraper. However, it is complicated to form scrapers individually having the slide edge molded in predetermined inclination or having its whole shape molded in predetermined inclination. Therefore, it is preferable that the scraper housing portion comprises a space having a shape inclined in downward pitch toward the base. In this case, it is advantageous to carry out the inclination of the slide edge easily in that the scraper can be mounted to the scraper housing portion regardless of structure thereof since the scraper housing portion is inclined itself.

Additionally, the scraper may be provided on one of the opposed wings to be opposed to the glass guide provided on the other wing to support the window glass sandwiched integrally with the glass guides. The glass guides serve to guide a window glass, and the scraper serves to peel off foreign substances in sliding contact with the surface of the window glass to peel off foreign substances. Thus, each of the glass guide and the scraper has a different function. On the other hand, it is desirable that the slide edge of the scraper is press-contacted with the surface of the window glass so as to peel off foreign substances surely from the surface of the window glass. Moreover, it is also desirable that one of the glass guides is located on the wing in opposition to the scraper located so as to prevent escaping the window glass from pressure contact with the scraper. In this configuration, the scraper also serves as a glass guide. In case of adopting the construction in which a scraper is removable from the scraper housing portion, the scraper housing portion may be provided in a position opposed to the glass guides.

In material and structure of the scraper, there is no restriction for selecting thereof as long as the scraper is basically kept in sliding contact with the surface of the window glass. However, from the viewpoint of above description on which the scraper is desirable to be in pressure contact with the surface of the window glass, the scraper is preferable to be a member having at least a constant elasticity. Accordingly, the scraper may be configured that at least the slide edge into slidingcontact with the window glass comprises an elastic body. Concretely, the scraper is configured that at least a slide edge into sliding contact with the window glass is made of rubber. In case that more sufficient elasticity is desired, the whole scraper may be formed from an elastic body or rubber. Further, the scraper adopts the plate spring structure having a pair of leg portions supporting both ends of the plate as if the scraper opens their legs so that the scraper can display a stronger elastic force. Concretely, it can be exemplified that a scraper is an integrally molded rubber manufacture, in a horizontal cross section, including a pair of the leg portions, a plate spring portion provided onto the leg portions and a protruding portion having a top as the slide edge protruding from a center of the plate spring portion.

The lower sash made of resin according to the present invention can achieve to suppress or prevent entry of foreign substances itself by utilizing the scraper. While the scraper is configured to be removable, it is also applicable to the basic lower sash added simple design variation. Accordingly, in this example, it causes hardly increase in manufacturing cost. Further, since entry of foreign substances into the lower sash can be adequately prevented, a high effect of eliminating generation of noise can be achieved. Additionally, the removable scraper described above enables ready replacement thereof caused by deterioration with the passage of time and produces an advantage that the effect of preventing entry of foreign substances can be continuously supplied. Furthermore, selection of a material for the scraper according to an object can also be achieved, and it brings an effect of easy separation of the scraper from the lower sash at the time of scrapping.

DETAILED DESCRIPTION OF THE INVENTION

An embodiment of the invention will be described below with reference to the drawings.

Figure 1:
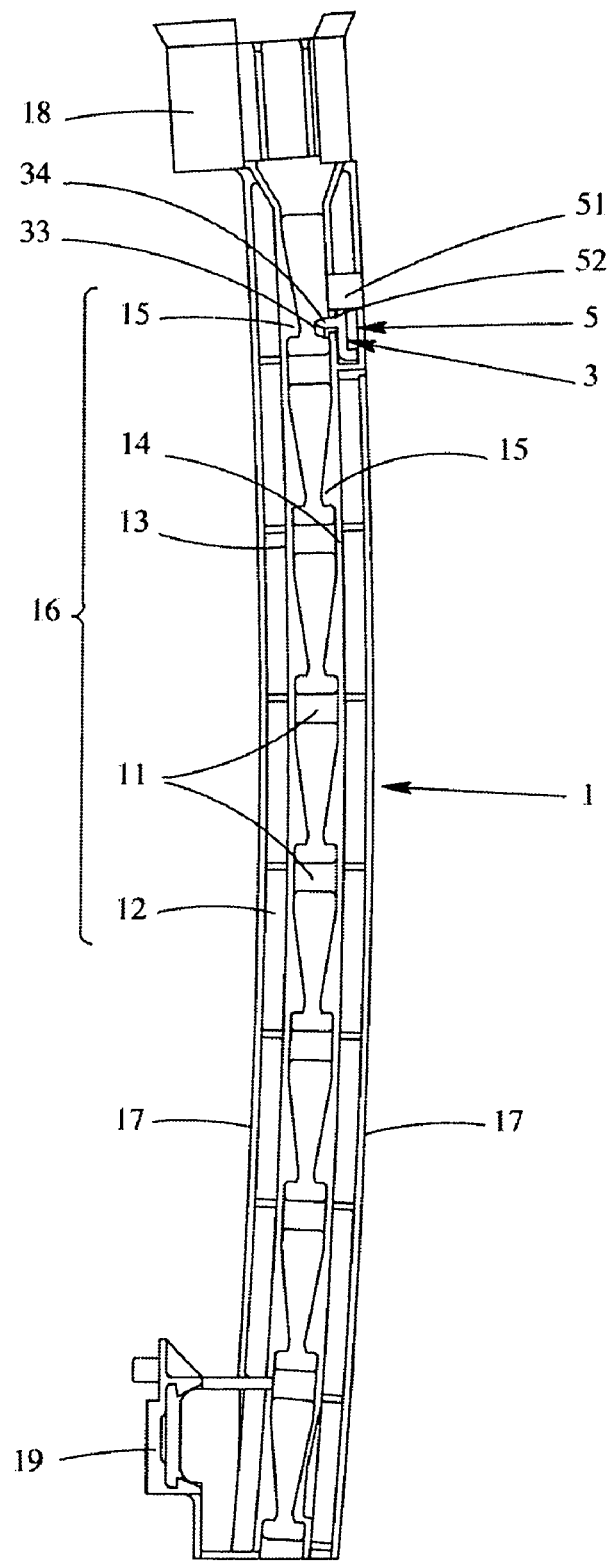
FIG. 1 is a left side view showing an embodiment of a lower sash made of resin according to the present invention.

A lower sash made of resin 1 according to the present invention is an integrally molded resin manufacture, as shown in FIG. 1, for example, having a curved shape copied a shape of a door panel (not shown). The lower sash made of resin 1 according to the embodiment comprises a frame 16 having a substantially channel-structure (refer to FIG. 1). The frame 16 comprises a base 12 having a ladder-shape formed by arranging a plurality of an orthogonal rib 11 intermittently in direction of inside-outside of a vehicle, and an inner wing 13 and an outer wing 14 integrally molding a plurality of a glass guide 15 provided in parallel to the base 12. The glass guides 15 individually having a plan view in the shape of a substantially isosceles triangle are provided mutually in the opposing relation to the edges of the inner wing 13 and the outer wing 14. A scraper 3 is detachably mounted in a scraper housing portion 5 provided on the outer wing 14 at the position opposed to atop one in the glass guides 15 provided on the inner wing 13, that is, at the position corresponding to vicinity of an upper end of the frame 16. As a result, the scraper 3 according to the embodiment supports a window glass 4 sandwiched with the glass guide 15 and thereby to guide the window glass 4 traveling.

Figure 2:
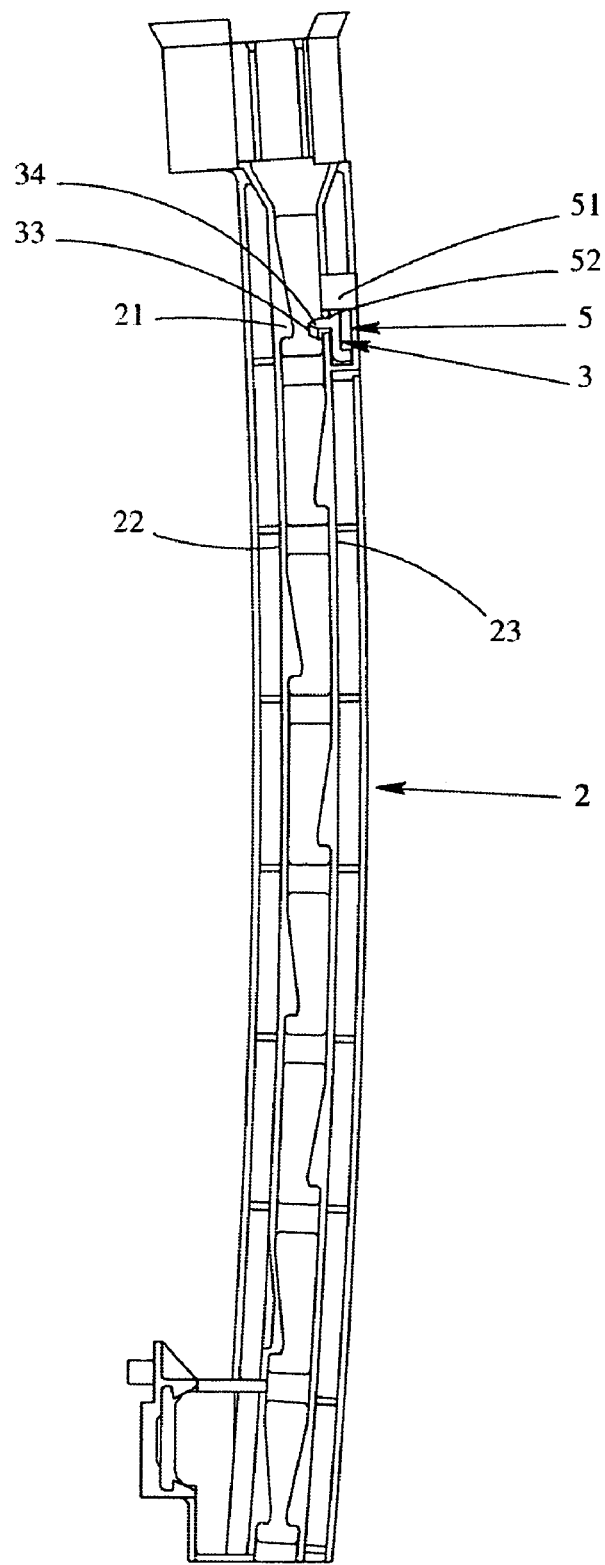
FIG. 2 is a left side view showing a further embodiment of the lower sash made of resin.

Additionally, in order to enhance the rigidity of the whole lower sash, as shown in the present lower sash 1, extending ribs 17, 17 may be provided on both edges of the base 12. Also, a connecting portion 18 for connecting an upper sash (not shown) may be provided on the upper end of the frame 16 and a mounting portion 19 for mounting to a door panel (not shown) may also be provided on a lower end of the frame 16. These elements are unrestricted in their structure or constitution. The glass guides 15 are also unrestricted in their constitution. For example, as shown in FIG. 2, the glass guides 21 may be alternately provided relative to an inner wing 22 and an outer wing 23, respectively. In case of adopting this constitution, however, the scraper 3 is preferably provided or detachably mounted on the outer wing 23 at the position opposed to a top one in the glass guides 21 provided on the inner wing 22.

Figure 3:
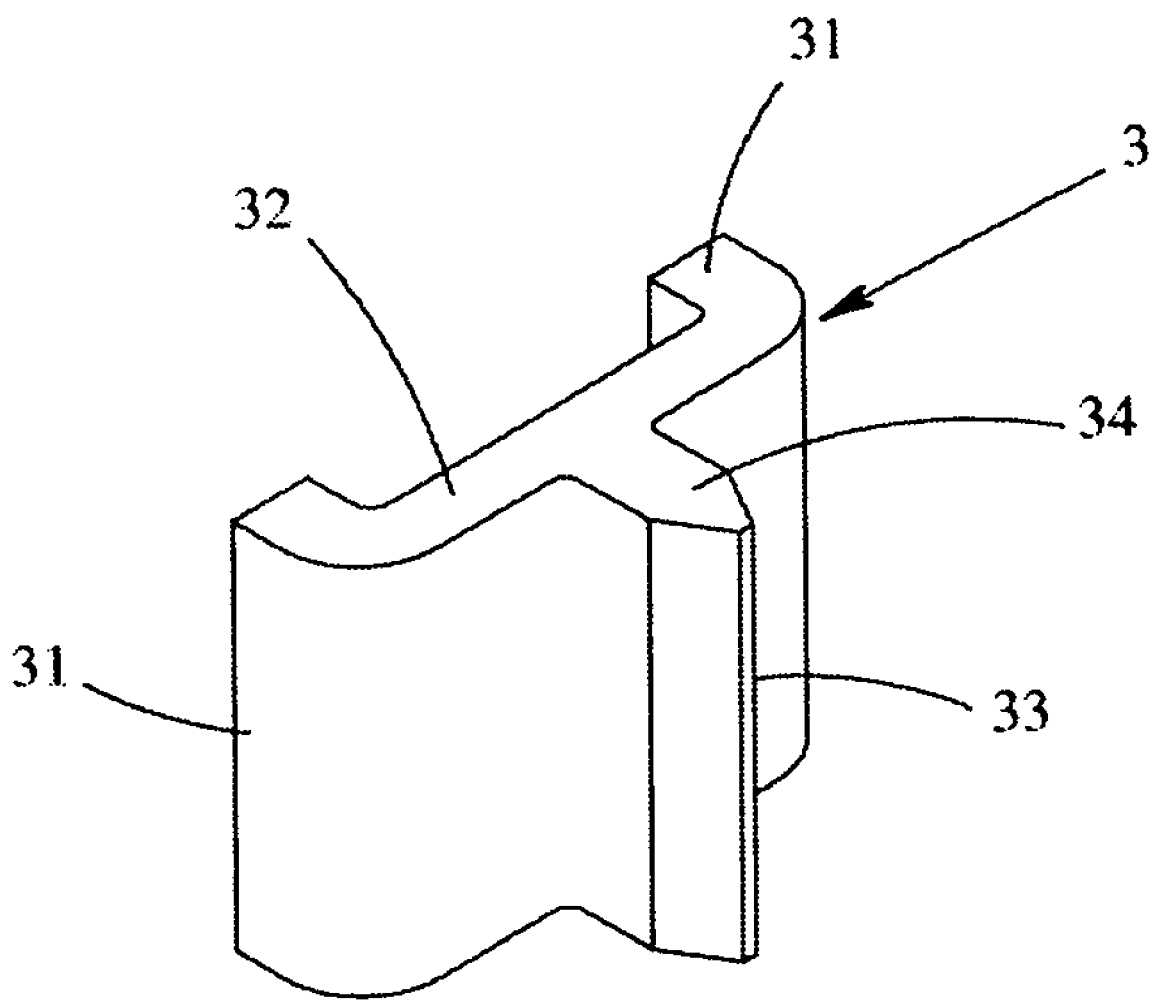
FIG. 3 is a front perspective view of a scraper used in the embodiment.
Figure 4:
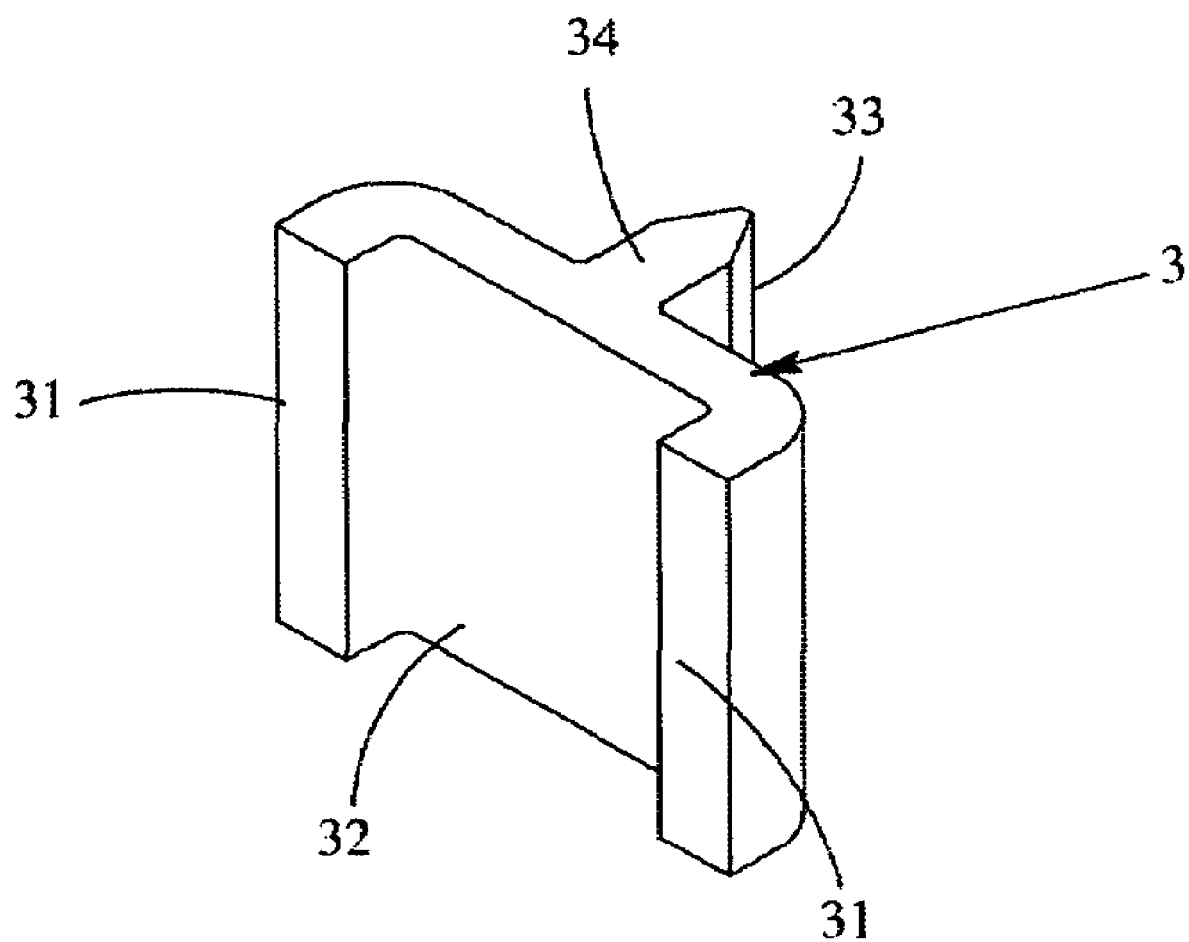
FIG. 4 is a rear perspective view of the scraper shown in FIG. 3.
Figure 5:
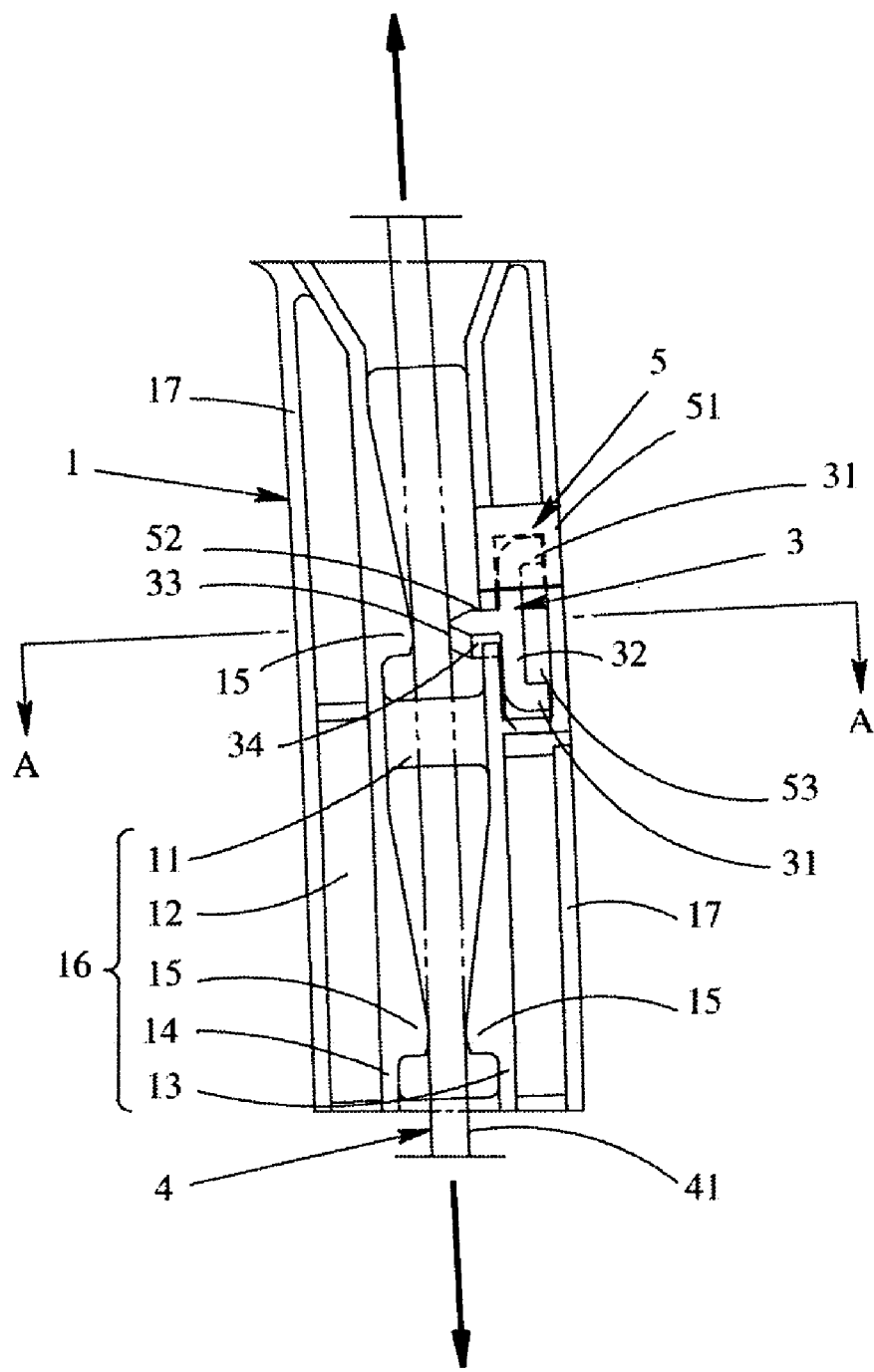
FIG. 5 is a partially enlarged side view corresponding to vicinity of the scraper in FIG. 1.
Figure 6:
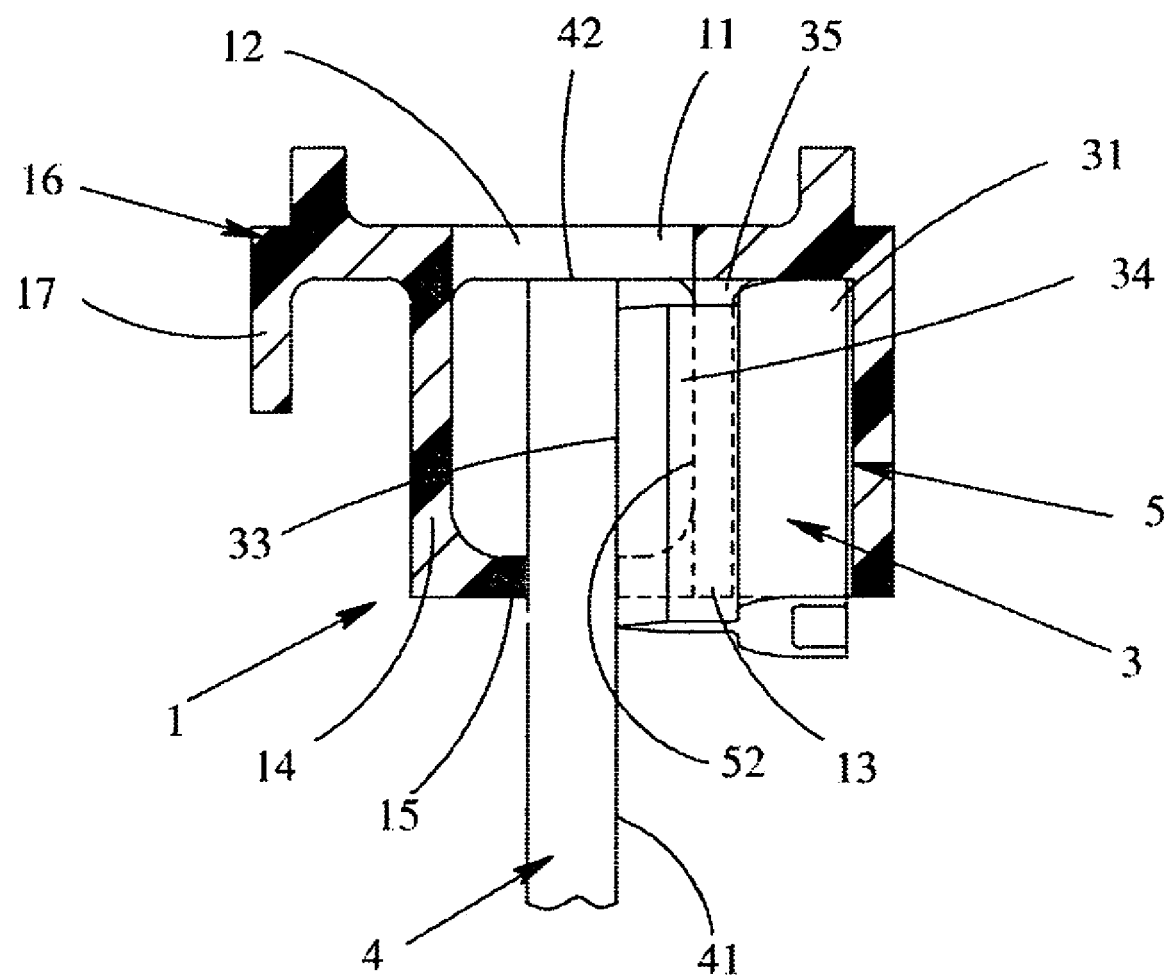
FIG. 6 is a sectional plan view taken on line A-A in FIG. 5.
Figure 7:
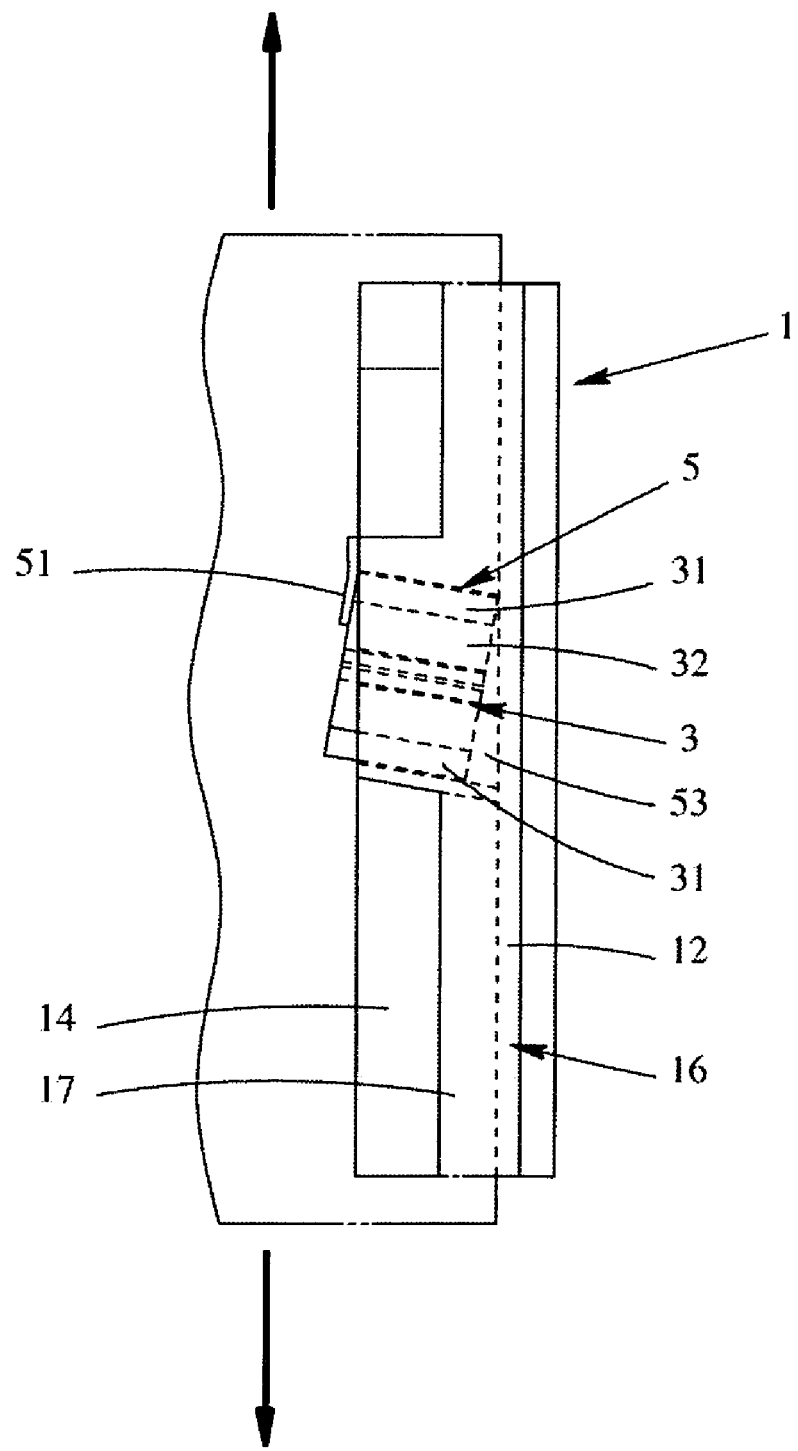
FIG. 7 is a partially enlarged front view corresponding to vicinity of the scraper in FIG. 1.

As shown in FIGS. 3 and 4, the scraper 3 in this embodiment is an integrally molded manufacture made of rubber including a pair of leg portions 31, 31, a plate spring portion 32 provided onto the leg portions and a protruding portion 34 having its top as a slide edge 33 protruding from a center of the plate spring portion 32 in a horizontal cross section. The protruding portion 34 is protruding elastically by means of the plate spring portion 32 supported by the both leg portions 31, 31 thereby to press the inclined slide edge 33 against an outer surface 41 of the window glass 4.

In the present embodiment, the inclined scraper housing portion 5 is adopted so that the scraper 3 can be mounted in the scraper housing portion with predetermined inclination. The present scraper housing portion 5, as shown in FIGS. 5 to 8, is provided as a space having a rectangular parallelopiped shape inclined in downward pitch toward the base 12 to the position between the outer wing 14 and the extending rib 17 of the base 12. The space is sized to surround the both leg portions 31, 31 and the plate spring portion 32 of the scraper 3. Further, the outer wing 14 defining a side face of the rectangular parallelopiped space is provided with an inclined slit 52 so that the protruding portion 34 of the scraper 3 can be protruded throughout the slit 52 toward the window glass when it is housed in the scraper housing portion 5. Furthermore, in order to prevent from easily dropping the housed scraper 3 out from the scraper housing portion 5, an elastic engagement plate 51 is formed to cover a part of the opened surface of the scraper housing portion 5. The opening surface of the scraper housing portion 5 is to be an entry of the scraper 3.

Figure 8:
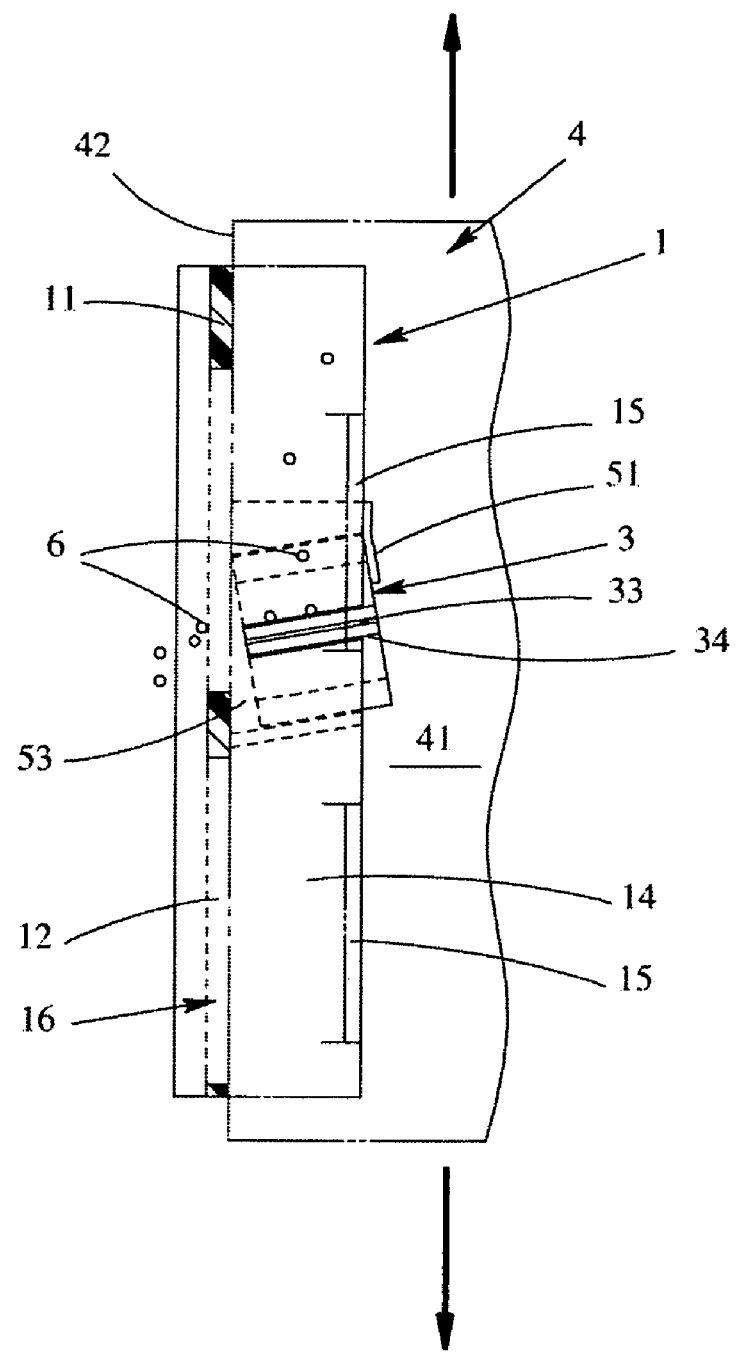
FIG. 8 is a sectional rear view taken along the axis of a lower sash made of resin showing the function of the scraper during removing foreign substances.

The scraper 3 inserted and housed in the scraper housing portion 5 is inclined together with the slide edge 33 thereof by individually following the protruding portion 34 to the inclined slit 52 and by following the both leg portions 31, 31 and the plate spring portion 32 to the inclined scraper housing portion 5 (refer to FIG. 8). As a result, restriction of the drop direction of the foreign substances 6 can be easily and surely achieved. Of course, the constitution in that inclination is applied to only the slide edge 33 of the scraper 3 corresponding to the predetermined inclination of the slit 52 of the scraper housing portion 5 may be adopted, as long as restriction of the drop direction of the foreign substances 6 can be achieved.

In case of using the inclined scraper housing portion 5, a surplus space 53 is formed in the scraper housing portion 5 by housing the scraper 3 having a rectangular shape in its front view while being inclined. The surplus space 53 serves as a space for allowing the scraper 3 integrally molded by rubber to deform elastically, as well as providing a relief space for the scraper 3 in the case where an excessive load is applied. As a result, the scraper 3 can serves in smooth removal of the foreign substances 6.

Also, according to the present embodiment, it is desirable to prevent from dropping the scraper 3 out easily from the scraper housing portion 5 since the entry of the scraper housing portion 5 opens to enable the scraper 3 detachable. Therefore, the elastic engagement plate 51 is formed to cover a part of the opening surface of the scraper housing portion 5, as described above, and engages the one of the leg portions 31 of the scraper 3. As a result, it can be achieved to prevent from dropping the scraper 3 out from the scraper housing portion 5. Since the scraper 3 of this embodiment is wholly made of rubber having flexibility or elasticity, the scraper 3 can be easily fitted into the scraper housing portion 5 while being deformed and thereby to engage the leg portion 31 of the scraper 3 to the engagement plate 51.

As shown in FIG. 8, in the scraper 3 of this embodiment, the slide edge 33 having its width a little wider than a width from a side edge 42 of the window glass 4 to an edge of the outer wing 14, 23 is sliding contacted with the outer surface 41 of the widow glass 4 and thereby to peel off the foreign substances. However, the foreign substances 6 are peeled off the slide edge 33 only in the fixed range on the outer surface of the window glass 4 passing through the lower sash 1. Accordingly, there is still a possibility to enter the foreign substances 6 into the lower sash 1 caused by which the foreign subtances 6 peeled off once adhere to the window glass 4 again, depending upon the direction of falling foreign substances 6. Therefore, as shown in the present embodiment, the slide edge 33 inclined in downward pitch toward the base 12 peels off the foreign substances 6 to fall in a direction away from the window glass 4. This constitution can avoid possibilities of re-adherence of the foreign substances 6 to the outer surface 41 of the window glass 4.

I claim:

1. A lower sash made of resin comprising a substantially channel-structured frame extending along a direction in which a window glass ascents and descends, the frame comprising a base, a pair of wings provided being opposed to each other upright on both sides of the base, and a plurality of glass guides provided on opposed surfaces of the both wings, and further comprising a scraper provided at an upper end of the frame or in a vicinity of the upper end to come into sliding contact with an outer surface or inner surface of the descending window glass, said scraper having a sliding contact edge inclined in downward pitch toward the base and said sliding contact edge having a wider width than a width from a side edge of the window glass to an edge of an outer wing.

2. The lower sash made of resin according to claim 1, wherein the scraper is provided on at least one of the opposed wings to come into sliding contact with the window glass in the same manner as the glass guides.

3. The lower sash made of resin according to claim 1, wherein the scraper is removable from a scraper housing portion provided on at least one of the opposed wings.

4. The lower sash made of resin according to claim 1, wherein the scraper is removable from a scraper housing portion provided on at least one of the opposed wings, and an engagement portion is provided on an opening portion of the scraper housing portion to prevent from dropping the scraper out.

5. The lower sash made of resin according to claim 1, wherein the scraper is removable from a scraper housing portion provided on at least one of the opposed wings, the scraper housing portion is inclined in downward pitch toward the base so that the slide edge of the scraper mounted to the scraper housing portion is inclined by corresponding to an inclination of the scraper housing portion.

6. The lower sash made of resin according to claim 1, wherein the scraper is removable from a scraper housing portion provided on at lest one of the opposed wings, the scraper housing portion is inclined in downward pitch toward the base so that the slide edge of the scraper mounted on the scraper housing portion is inclined by corresponding to the inclination of the scraper housing portion, and an engagement portion is provided on an opening portion of the scraper housing portion to prevent from dropping the scraper out.

7. The lower sash made of resin according to claim 1, wherein the scraper is provided on one of the opposed wings to be opposed to the glass guide provided on the other wing to support the window glass sandwiched integrally with the glass guides.

8. The lower sash made of resin according to claim 1, wherein at least a slide edge of the scraper to come into sliding contact with the window glass is an elastic body.

9. The lower sash made of resin according to claim 1, wherein at least the slide edge of the scraper to come into sliding contact with the window glass is made of rubber.

10. The lower sash made of resin according to claim 1, wherein the scraper is an integrally molded rubber manufacture including a pair of leg portions, a plate spring portion provided onto the leg portions a protruding portion protruding from a center of the plate spring portion and the slide edge is provided on a top of the protruding portion.

* * * * *